(12) United States Patent
Poulad et al.

(10) Patent No.: US 9,461,570 B1
(45) Date of Patent: Oct. 4, 2016

(54) VARIABLE TORQUE CONTROL OF A STEPPER MOTOR

(71) Applicant: Amazon Technologies, Inc., Seattle, WA (US)

(72) Inventors: Navid Poulad, Sunnyvale, CA (US);
Jijie Xu, Cupertino, CA (US);
Christopher D. Coley, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/634,683

(22) Filed: Feb. 27, 2015

Related U.S. Application Data

(63) Continuation of application No. 13/857,948, filed on Apr. 5, 2013, now Pat. No. 8,975,854.

(51) Int. Cl.
*G05B 19/40* (2006.01)
*H02P 8/30* (2006.01)
*H02P 8/12* (2006.01)

(52) U.S. Cl.
CPC .. *H02P 8/30* (2013.01); *H02P 8/12* (2013.01)

(58) Field of Classification Search
CPC ................................. H02P 8/12; H02P 8/30
USPC .......................................................... 318/685
See application file for complete search history.

(56) References Cited

U.S. PATENT DOCUMENTS

| | | |
|---|---|---|
| 4,888,542 A | 12/1989 | Muranaka |
| 4,929,879 A | 5/1990 | Wright et al. |
| 5,659,234 A | 8/1997 | Cresens |
| 6,188,196 B1 | 2/2001 | Koide et al. |
| 7,418,392 B1 | 8/2008 | Mozer et al. |
| 7,720,683 B1 | 5/2010 | Vermeulen et al. |
| 7,774,204 B2 | 8/2010 | Mozer et al. |
| 2007/0132423 A1 | 6/2007 | Ajima et al. |
| 2012/0223885 A1 | 9/2012 | Perez |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Erick Glass
(74) *Attorney, Agent, or Firm* — Lee & Hayes, PLLC

(57) ABSTRACT

A stepper motor may be controlled by a controller to provide extended revolution of a motor shaft while operating in a first mode and to allow a user to manually intervene with an intended position or rotation of the motor shaft while operating in a second mode. In some embodiments, the controller may adjust a torque applied to the stepper mode during operation of the stepper motor. The controller may reduce a torque applied by the stepper motor to a lower torque while the user intervenes with the intended position or rotation of the motor and increase the torque to a holding torque after the user intervention has ended. Thus, the controller may dynamically adjust a torque of the stepper motor in response to detection of the user intervention.

20 Claims, 8 Drawing Sheets

VARIABLE TORQUE CONTROL OF A STEPPER MOTOR

CROSS-REFERENCE TO RELATED APPLICATIONS

This application is a continuation of, and claims priority to, co-pending, commonly-owned U.S. patent application Ser. No. 13/857,948, entitled "Variable Torque Control of a Stepper Motor", filed on Apr. 5, 2013, which application is incorporated herein in its entirety by reference.

BACKGROUND

Brushless direct current (BLDC) motors are used in many different applications that primarily involve continuous revolution of a motor shaft. For example, a BLDC motor may be used to rotate a data disc at a constant angular velocity. In contrast, stepper motors are often used to make controlled incremental rotations of a motor shaft, which often include relatively frequent pauses or stoppages between the movements. For example, a stepper motor may cause movement of a laser used to read data from the data disc. However, a stepper motor may be controlled to provide extended revolution of the motor shaft, and thus operate similar to a BLDC motor. A controller may cause outputs of variable current to the coils of the stepper motor to provide extended revolution of the motor shaft.

Sometimes, operation of a motor shaft is hindered by user interaction with the motor shaft or user interaction with a part coupled to the motor shaft. For example, a user may desire to move a part that is under control of a motor. Unlike BLDC motors, stepper motors may accommodate user interaction without at least some of the adverse effects experienced by the BLDC motors, such as heat generation and/or damage to the coils of the motor when the user interaction applies a force against a controlled rotation of the motor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed, in part, to systems, devices, and techniques to control a stepper motor by a controller to provide extended and smooth revolution of a motor shaft while operating in a first mode and to allow a user to manually intervene with an intended position or rotation of the motor shaft while operating in a second mode. The stepper motor may enable a reposition of the motor shaft by the user (or a component driven thereby) without use of additional components in a drive train assembly (e.g., without a clutch, etc.).

In some embodiments, the controller may adjust a torque applied to the stepper mode during operation of the stepper motor. For example, the controller may reduce a torque applied by the stepper motor to a lower torque while the user intervenes with the intended position or rotation of the motor and increase the torque to a holding torque (e.g., at least a minimum torque to maintain a position of the motor shaft relative to a stator of the stepper motor) after the user intervention has ended. Thus, the controller may dynamically adjust a torque of the stepper motor in response to detection of the user intervention. The user intervention may include the user intentionally or unintentionally restraining or moving a component that is driven by the motor shaft, such as a head of a movable projector or other movable arm, component, device, or portion thereof.

The controller may receive various inputs and/or feedback from components in a system. For example, the controller may receive a current feedback from a driver that also outputs currents to the stepper motor. The controller may receive position feedback from an encoder that tracks movement of the stepper motor. In various embodiments, the controller may receive a signal from other sensors that indicate an in-progress user intervention, an impending user interaction, and/or a termination of a user interaction. For example, the other sensors may include a proximity sensor such as a touch sensor.

The systems, devices, and techniques described herein may be implemented in a number of ways. Example implementations are provided below with reference to the following figures.

Figure 1:
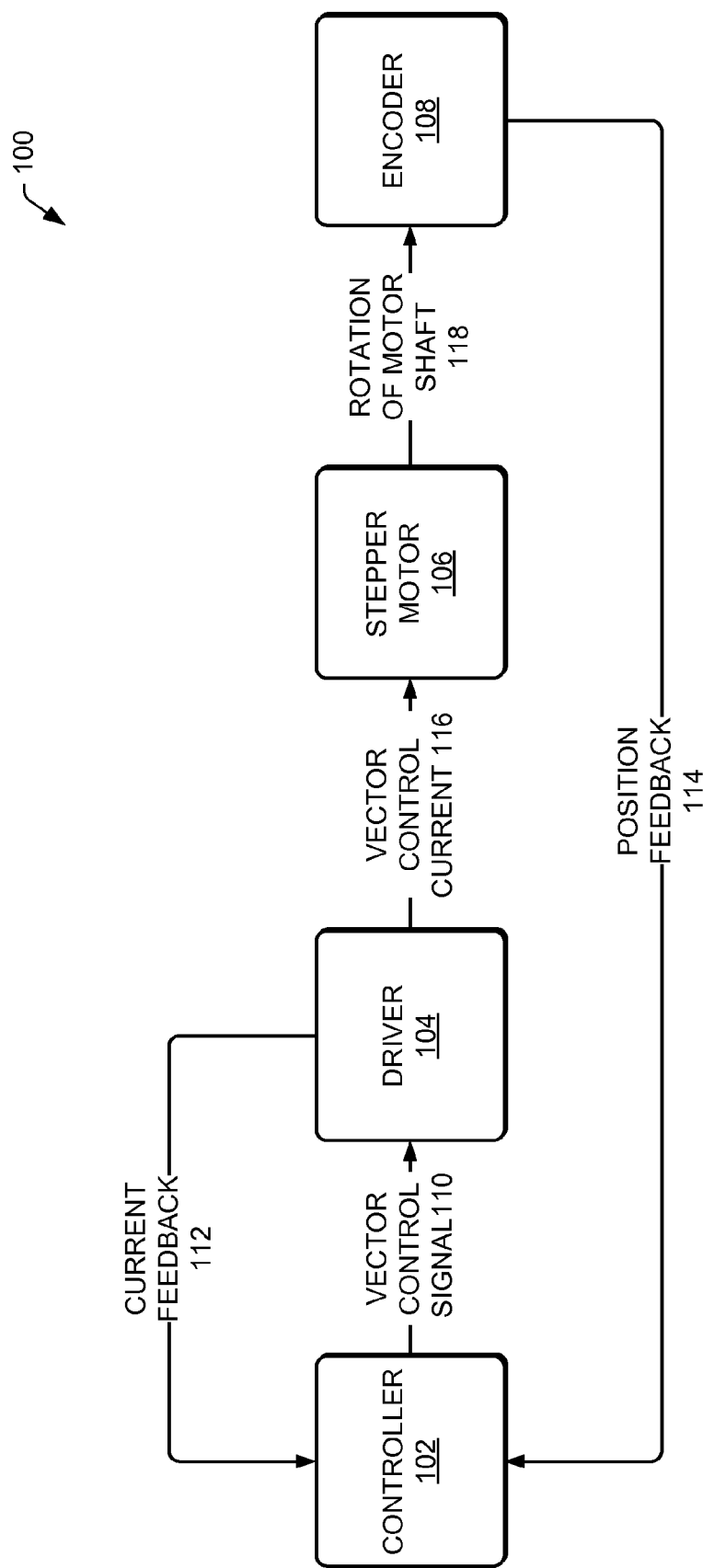
FIG. 1 shows a block diagram of an illustrative system to control a stepper motor using variable torque control.

FIG. 1 shows a block diagram of an illustrative system 100 to control a stepper motor using variable torque control. The system 100 may include a controller 102, a driver 104, a stepper motor 106 and an encoder 108, each discussed in turn.

The controller 102 may output a vector control signal 110 to the driver 104. The vector control signal 110 may cause positioning, velocity, acceleration, and/or torque controls to be received and implemented by the driver 104. In some embodiments, the controller 102 may generate the vector control signal 110 based on inputs received from other controllers such as a central controller, which may be used to control an entire device or part of an entire device. The controller 102 may generate the vector control signal 110 based at least in part on current feedback 112 from the driver 104, position feedback 114 from the encoder 108 and/or other feedback or signals (e.g., signals from a proximity sensor, etc.). Thus, the controller 102 may receive various inputs, such as an operation to perform, signals representing a state of operation of the stepper motor 106, and/or other inputs, and then create an output based on the various inputs.

In various embodiments, the controller 102 may be implemented using a microcontroller that is located near or on the stepper motor.

The current feedback 112 may include back electromagnetic field(s) (EMF) detected by the driver, which may be caused by user intervention with the position or rotation of a motor shaft of the stepper motor 106. The position feedback 114 may include an amount of actual rotation of the motor shaft, a direction of the actual rotation, and/or other position information and/or movement information that describes an actual position and/or rotation of the motor shaft that is driven by the stepper motor 106.

The driver 104 may receive the vector control signal 110 from the controller 102 and then determine vector control current 116 of an amount of current to output to each coil of the stepper motor 106 to cause rotation of the motor shaft, to prevent rotation of the motor shaft (e.g., hold a particular position), or to enable user intervention with the motor shaft (cause reduced torque to allow the user rotation). The driver 104 may generate the vector control current 116 to be applied to each coil of the stepper motor 106, which may be a two phase stepper motor.

In accordance with one or more embodiments, the vector control current 116 may cause the stepper motor 106 to, at least momentarily, operate similar to a brushless direct current (BLDC) motor and provide extended revolution of the motor shaft. Thus, instead of causing a single movement between detents, which are typically spaced 1.8 degrees apart, the driver 104 may cause the motor shaft to rotate past multiple or many detents before pausing or stopping rotation. The vector control signal 110 and/or the vector control current 116 may be formed using square waves, using triangular waves, or using analog-type waves, such as sine waves or cosine waves. The waves for each phase may be offset (e.g., 90 degrees out of phase from one another, etc.) for each coil to provide precise movement of the motor shaft. The driver 104 may cause relatively smooth motion of the stepper motor (e.g., reduce or remove "jumping" between detents) by providing vector controls using sine waves or other analog-type waves.

The driver 104 may also cause adjustments to a torque applied by the stepper motor 106 via the vector control current 116. The torque is proportional to the sum of the current of the vector control current 116. The driver, under control of the controller 102, may thereby increase or decrease the torque applied by the stepper motor 106 by increasing or decreasing a multiplier applied to the vector control current. As discussed herein, the torque may be adjusted to enable a user to intervene with a position or a rotation of the motor shaft, to create a holding torque to prevent movement of the motor shaft, and/or for other reasons.

The stepper motor 106 may be a two phase stepper motor that includes two windings, a stator, and a motor shaft that rotates as part of a rotor relative to the stator (stationary part). In some embodiments, the stepper motor 106 may include detents that are 1.8 degrees apart from one another; however, the stepper motor may use other spacing between the detents. Other configurations of the stepper motor 106 may also be used that allow movement of the motor shaft between detents by varying input currents via the vector control current 116.

The encoder 108 may determine position information and/or movement information associated with the stepper motor 106. Thus, the encoder 108 may measure rotation 118 of the motor shaft. The encoder 108 may determine the rotation and/or position information (e.g., location, angle, detent, etc.) using optical information, using magnetic information, using physical information, and so forth. For example, the encoder 108 may be implemented as an optical encoder that measures the rotation 118 of the motor shaft by tracking (e.g., counting) changes in optical signals. The encoder may also track magnetic indicators (via a magnetic encoder) or use contacts on the motor (e.g., electrical, mechanical, or electromechanical encoder).

In some embodiments, position feedback 114 may be determined by the controller 102 (or possibly by the encoder 108) based on the vector control current 116 and the current feedback 112 (e.g., output side of the stepper motor 106 possibly after intervention by a user). For example, the controller 102 may count each pulse of the vector control current and/or current feedback (which may reflect movement from user intervention). The controller 102 may analyze a phase relationship of the pulses to determine a direction of rotation (add or subtract to the count), and thus convert these counts into position information of the motor shaft.

By including the position feedback 114 and the current feedback 112, the system 100 may operate as a closed loop system. In some embodiments, the components of the system 100 (e.g., the controller 102, the driver 104, and the encoder 108) may be implemented in a small design package (assembly). The assembly may include additional components, such as gears or other components. However, the assembly does not have to include a clutch or other mechanism to enable slippage when the motor shaft is interfered with by a user since the design of the stepper motor 106 enables slippage when the holding torque resulting from the vector control current 116 is overcome by a torque imposed on the motor shaft by a user (or other force). Unlike a BLDC motor, the stepper motor 106 does not generate damaging heat or otherwise experience adverse effects when the motor shaft is prevented from moving in accordance with the vector control current 116, such as by intervention by a user.

Figure 2:
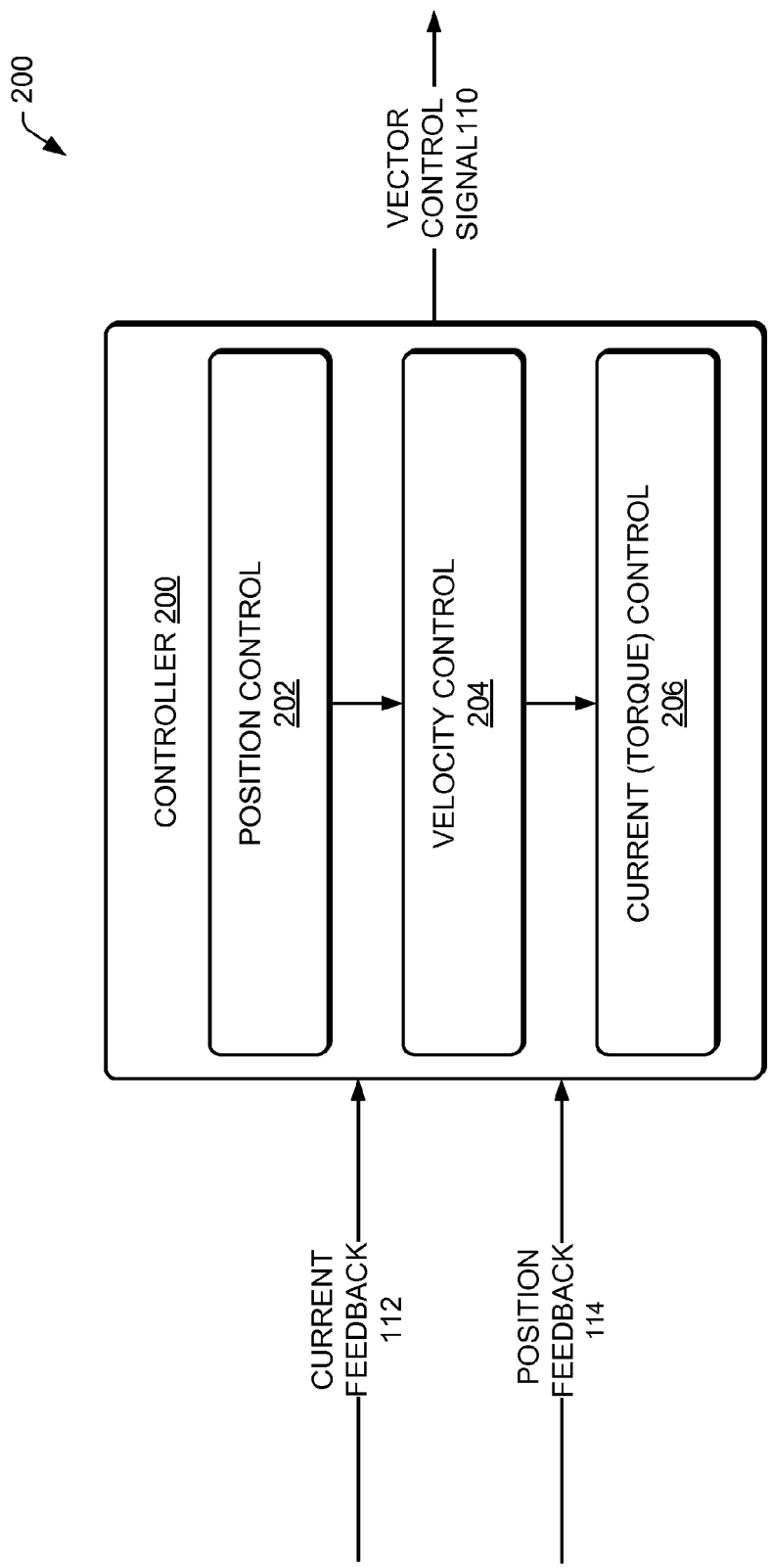
FIG. 2 shows a block diagram of an illustrative controller used to control the stepper motor using variable torque control.

FIG. 2 shows a block diagram of an illustrative controller 200 used to control the stepper motor using variable torque control. The controller 200 may be the same as or similar to the controller 102. The controller 200 may receive the current feedback 112, the position feedback 114, and/or other inputs (e.g., main controller signals, a proximity sensor signal, etc.) and may output at least a vector control signal 110, as discussed above.

The controller 200 may include various controls, which are shown in FIG. 2 as blocks. A position control block 202 may generate a velocity profile based at least in part on a position control loop that tracks the rotation 118 of the motor shaft. A velocity control block 204 may determine an amount of torque to be applied by the vector controls based on acceleration. The amount of torque may be calculated from a velocity profile generated by the position control block 202. A current control block 206 may cause control of the current output (via the vector controls) to the stepper motor 106 based on a desired torque. The desired torque be a holding torque, a torque for acceleration, no torque or a reduced torque (to allow easier movement of the motor shaft by a user), or other torque values, depending on the inputs received by the controller 102 and operations to be performed by the controller 102.

Figure 3:
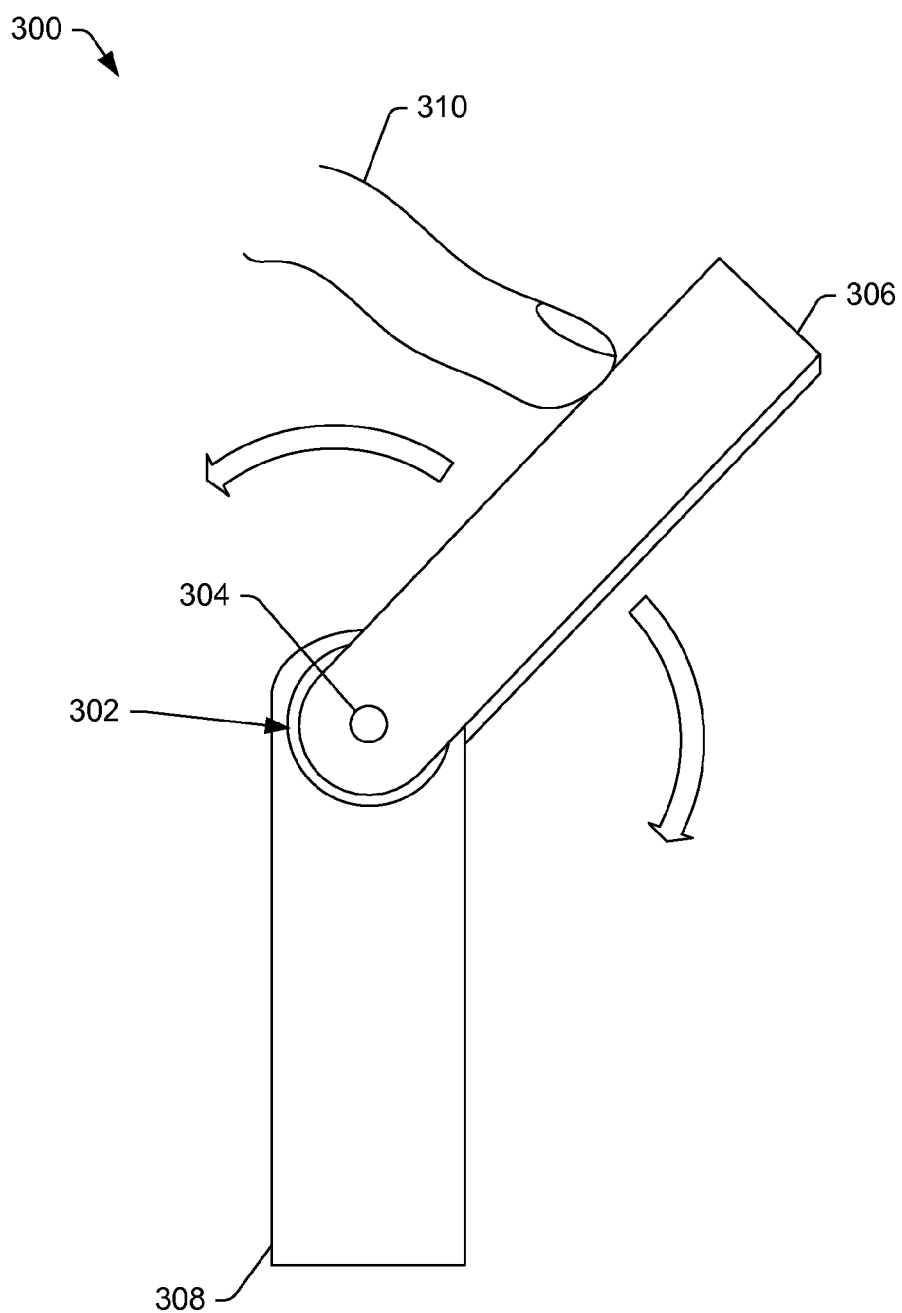
FIG. 3 shows an isometric view of an illustrative device that includes a stepper motor that is controlled with variable torque control.

FIG. 3 shows an isometric view of an illustrative device 300 that includes a stepper motor assembly 302 (e.g., the system 100 or similar systems) that provides variable torque control. The stepper motor assembly 300 ("assembly") controls rotation of a motor shaft 304.

The device includes a first part 306 coupled to the motor shaft 304 and a second part 308 coupled to a stator or other part of the assembly 302 other than the motor shaft 304. Thus, the first part 306 move relative the second part 308 when the assembly 302 causes rotation of the motor shaft 304. The device 300 may be configured as an elbow joint, a ball-and-socket joint, or other types of commonly used joints used in mechanical structures or devices.

The assembly, under control of the controller 102 and driver 104, may operate in two or more different modes of operation. The controller 102 may vary the torque applied by the stepper motor 106 based on the mode of operation. When operating in a first mode, the controller 102 may cause motion of the first part 306 relative the second part 308 by outputting the vector control signal 110 and causing the stepper motor 106 to receive the vector control current 116. The controller 102 may select a torque to be applied by the stepper motor 106 to maintain a position (e.g., holding torque) or cause rotation (e.g., torque for acceleration).

The controller 102 may detect interaction by a user 310 (or another force) with the device 300 through the current feedback 112 and/or the position feedback 114. In response to the detected interaction, the controller 102 may operate, at least temporarily, in a second mode. While in operation in the second mode, the controller 102 may reduce a torque of the stepper motor 106, at least temporarily, to allow movement of first part 306 relative to the second part 308 by the user. Once the movement has concluded (possibly determined by the current feedback 112 and/or the position feedback 114), the controller 102 may resume operation in the first mode. The operation of the assembly is further described with reference to the following figures.

Figure 4:
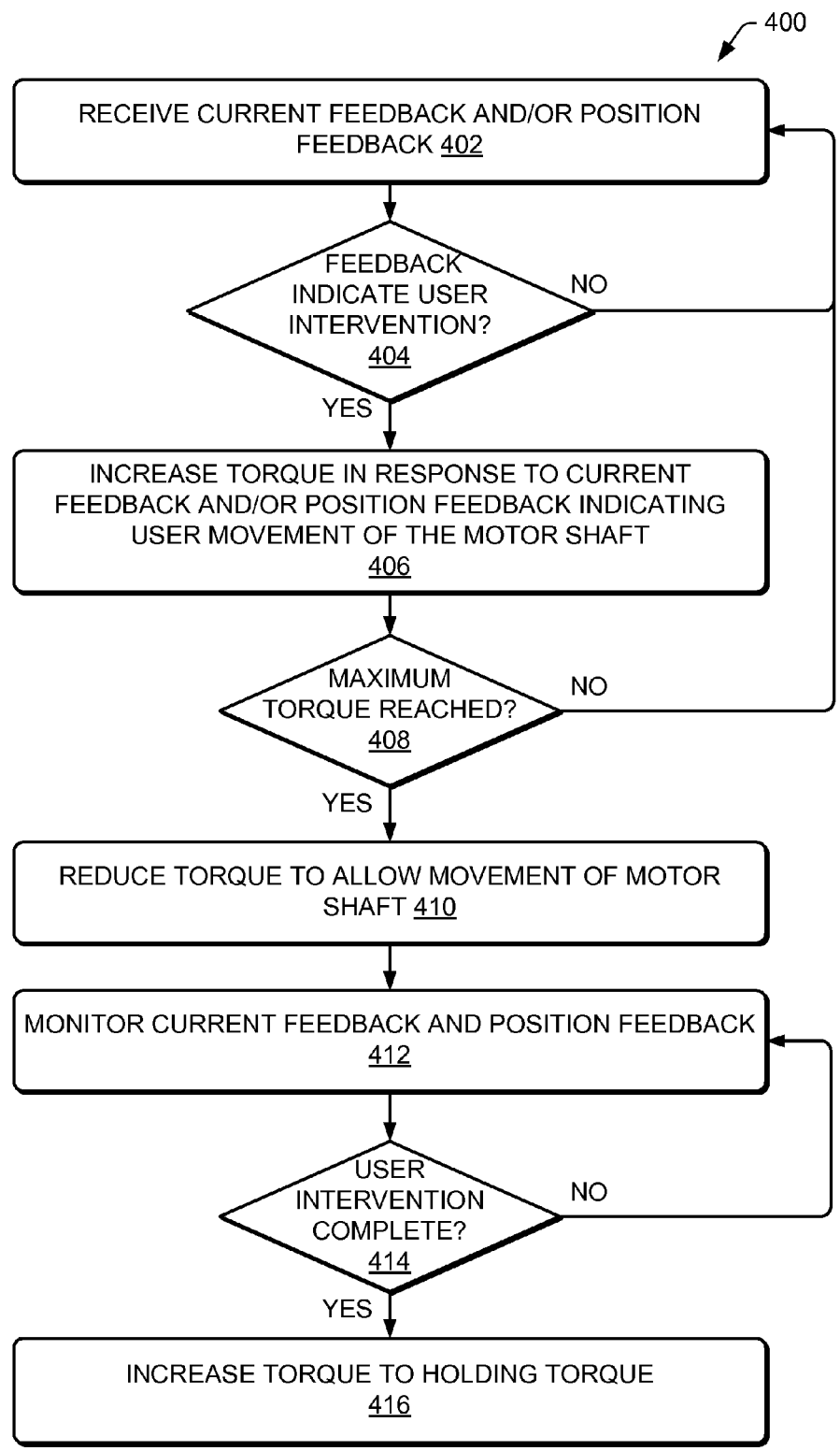
FIG. 4 shows a flow diagram of an illustrative process to control the torque of the stepper motor based on current sensing and/or position feedback.
Figure 5:
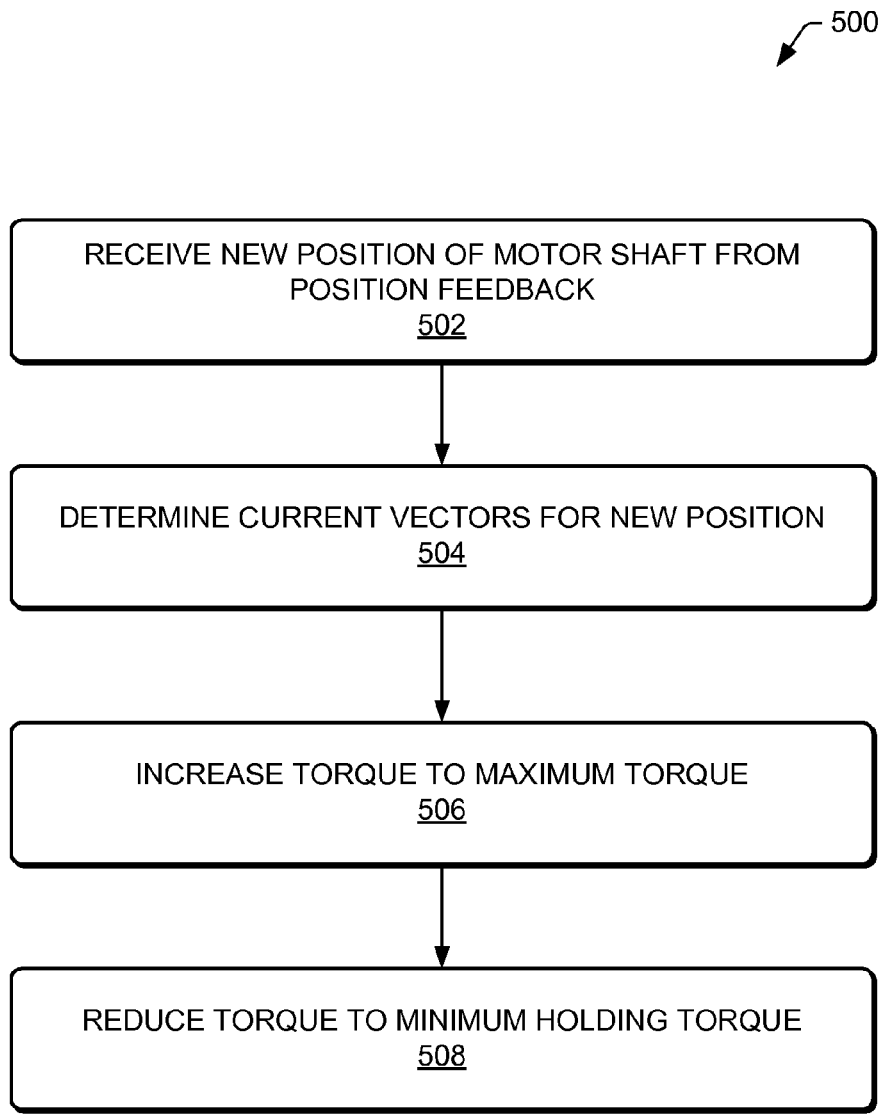
FIG. 5 shows a flow diagram of an illustrative process to update vector controls after a user intervenes with an operation of the stepper motor
Figure 7:
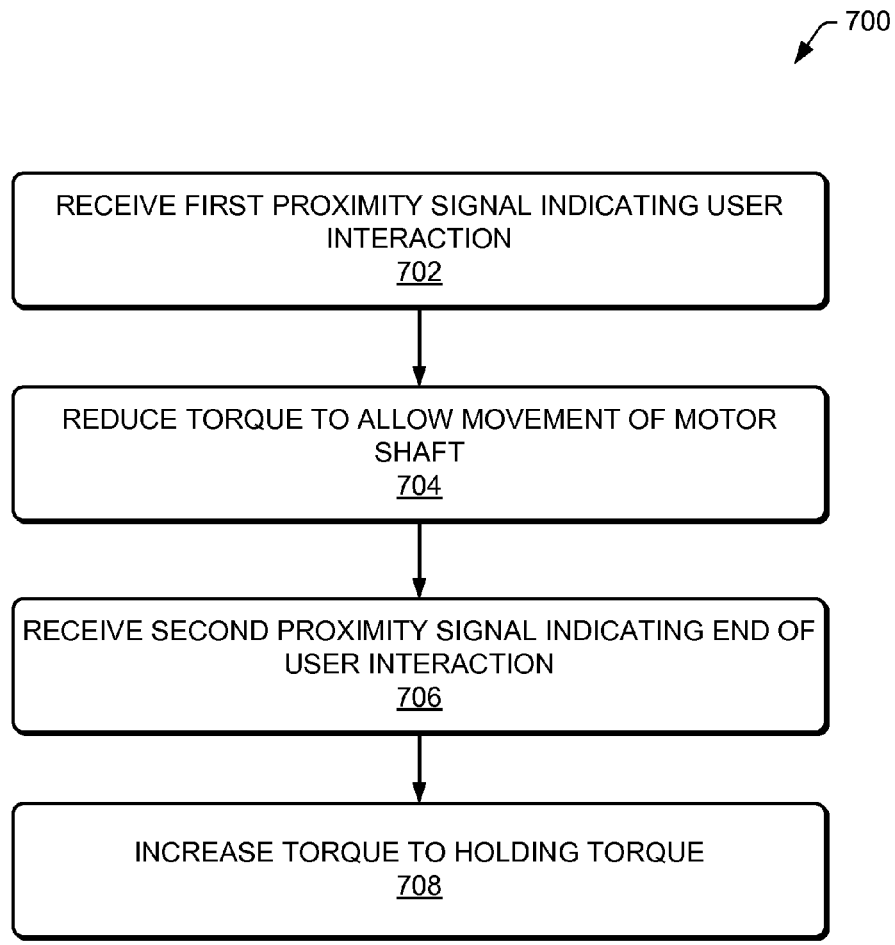
FIG. 7 shows a flow diagram of an illustrative process to control the torque of the stepper motor based in part on signals from the proximity sensor.

FIGS. 4, 5, and 7 illustrate processes that may be performed to operate the variable torque stepper motor discussed herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 shows a flow diagram of an illustrative process 400 to control the torque of the stepper motor 106 based on current sensing and/or position feedback. The process 400 is described with reference to FIG. 1; however, the process 400 may be implemented with any of the embodiments described herein.

At 402, the controller 102 may receive the current feedback 112, the position feedback 114, and/or other inputs or types of feedback that relate to an actual position of the motor shaft with respect to the position of the motor shaft that corresponds to the control vectors 116.

At 404, the controller 102 may determine whether the feedback from the operation 402 indicates user intervention with the motor shaft. For example, the controller 102 may determine that the current feedback 112 and/or the position feedback 114 indicate user intervention when an actual position of the motor shaft is different than a control position of the motor shaft that corresponds to the control vectors 116. When the controller 102 determines that the feedback does not indicate user intervention or other inference (following the "no" route from the decision operation 404), then the process 400 may return to the operation 402 and may continue to operate in a first mode of operation. However, when the controller 102 determines that the feedback indicates user intervention or an interference (following the "yes" route from the decision operation 404), then the process 400 may advance to an operation 406.

At 406, the controller 102 may adjust a torque applied by the stepper motor 106 in response to receipt of the current feedback 112 and/or the position feedback 114 from the operation 402. For example, the controller 102 may analyze the current feedback 112 to determine that back EMF exists that indicates that the motor shaft is positioned at an angle different than an angle corresponding to the vector control current 116 provided to the stepper motor (e.g., action position is different than the control position). The controller 102 may then increase the torque to attempt to move or relocate the motor shaft back to the angle associated with the vector control current 116. As another example, the controller 102 may analyze the position feedback 114 to determine that an actual position of the motor shaft is different than a control position corresponding to the vector control current 116 provided to the stepper motor. The controller 102 may then increase the torque to attempt to move the motor shaft back to the control position corresponding with the vector control current 116. Of course, the controller 102 may also use both the position feedback 114 and the current feedback 112 to determine to increase the torque. The operation 406 may be used in part to prevent unintentional movement of the motor shaft due to the effects of gravity and/or for other reasons.

At 408, the controller 102 may determine whether a maximum torque has been reached. For example, the controller may cause the stepper motor 106 to operate at a maximum torque by causing an increase in the total current output to the stepper motor 106 via the vector control current 116. When the maximum torque has not been reached (following the "no" route from the decision operation 408), the process may return to the operation 402. However, when the maximum torque has been reached (following the "yes" route from the decision operation 408), the process may advance to an operation 410 and the controller may begin to operate in a second mode of operation.

At 410, the controller 102 may reduce a torque applied by the stepper motor 106 to allow the user to continue to intervene with the motor shaft (e.g., manually moving a first part relative to a second part, etc.). For example, the controller 102 may cause output of less current or no current in the vector control current 116 to the stepper motor 106. In some embodiments, the controller may reduce the torque at the operation 410 immediately after reaching the maximum torque.

At 412, the controller 102 may continue to receive and monitor the current feedback 112 and/or the position feedback 114. The controller 102 may monitor the feedback to determine when the user intervention is terminated.

At 414, the controller 102 may determine whether the user intervention is complete (terminated). The controller 102 may determine that the user intervention is complete after a predetermined amount of time elapses without movement of the motor shaft, based on the current feedback (e.g., generating a test current vector and determining whether back EMF exists) or by other analysis (e.g., receipt of a signal from a proximity sensor, etc.). When the controller 102 determines that the user intervention is not complete (following the "no" route from the decision operation 414), then the process 400 may return to the operation 412 to provide continued operation in the second mode of operation (e.g., reduced torque to allow continued user interaction). When the controller 102 determines that the user intervention is complete (following the "yes" route from the decision operation 414), then the process 400 may advance to an operation 416.

At 416, the controller 102 may cause an increase in torque applied by the stepper motor 106. The increase in the torque may increase the torque to a holding torque to maintain an approximate current position of the motor shaft or the increase may be torque to cause acceleration and movement of the motor shaft under control of the controller 102 (as opposed to under control of a user). The controller 102 may increase the torque based at least in part on one or more of a signal from a proximity sensor indicating an end of the user intervention, the control position indicating no movement of the motor shaft during a first threshold amount of time, or no current feedback being received by the controller during a second threshold amount of time.

FIG. 5 shows a flow diagram of an illustrative process 500 to update the vector controls after a user intervenes with operation of the stepper motor. The process 500 is described with reference to FIG. 1; however, the process 500 may be implemented with any of the embodiments described herein. The process 500 may be performed to modify or refine the operation 416 described above in the process 400.

The vector controls provide specific currents to each of the coils, and cause the motor shaft to be positioned at a specific angle, which may be aligned with one of the many detents or between adjacent detents. When the user moves the motor shaft and then releases the motor shaft, the motor shaft will typically move to a closest position that corresponds to the last issued vector controls. Thus, the motor shaft may rotate (jump) to a new position that is often by rotation of less than 1.8 degrees, which is the typical spacing between detents. This movement may not be anticipated by the user and may be undesirable. To prevent this movement, the vector controls may be updated after the user moves the motor shaft so that the vector controls correspond to the location of the motor shaft at a time when the user terminates the user intervention.

At 502, the controller 102 may receive a new position of the motor shaft from the position feedback 114. For example, the position feedback may provide an exact or approximate position of the motor shaft at any given moment in time or may provide the position feedback 114 to the controller during movement (rotation) of the motor shaft. Thus, the controller 102 may have access to the position feedback 114 at a time when the user intervention is terminated. The controller 102 may detect the termination of the user intervention based on a change in rate of the movement caused by the user, based on proximity sensor information, and/or using data from other sensors.

At 504, the controller 102 may determine control vectors for the new position of the motor shaft. Thus, the controller 102 may update the existing or previous control vectors to correspond to the new position of the motor shaft.

At 506, the controller 102 may cause the stepper motor 106 to increase a torque applied by the stepper motor 106. As discussed above, the torque may be increased by increasing the currents of the control vector by a multiplier. The controller 102 may increase the torque to a maximum torque or any less amount of torque that maintains a position of the motor shaft. Since the motor shaft may support an arm or other part that is subjected to forces (e.g., gravity, biasing devices, etc.), then the holding torque may be used to maintain the new position of the motor shaft.

At 508, the controller 102 may reduce the torque to a minimum holding torque to reduce power consumption or for other reasons. Thus, the operations 506 may increase a torque to a value greater than the holding torque while the operation 508 may then reduce the torque to achieve an optimal holding torque.

Figure 6:
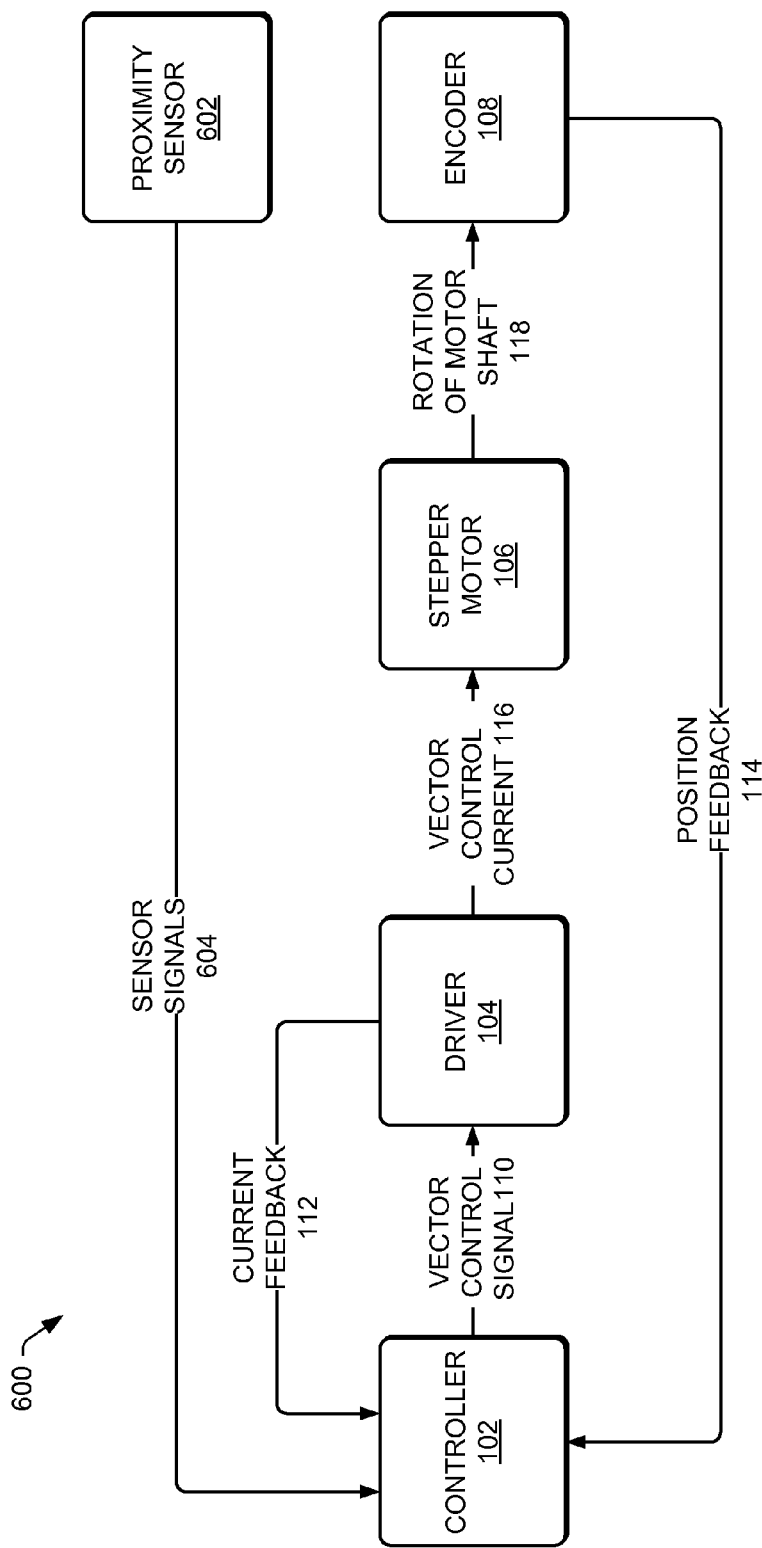
FIG. 6 shows a block diagram of an illustrative system that includes a stepper motor and a proximity sensor. The system controls a stepper motor using variable torque control based in part on signals from the proximity sensor.

FIG. 6 shows a block diagram of an illustrative system 600 that includes the stepper motor 106 and a proximity sensor 602. The system 600 controls the stepper motor 106 using variable torque control based in part on signals from the proximity sensor 602.

As shown in FIG. 6, the proximity sensor 602 may transmit the sensor signals 604 to the controller 102 for further processing. The proximity sensor 602 may include an electronic field (e-field) sensor, a capacitance sensor, a resistive touch sensor, a camera, and/or other types of sensors that can detect a presence of the extremity near or against a surface. The proximity sensor 602 may transmit the sensor signal 604 as a continuous signal (e.g., have a value associated with resistance, capacitance etc.) or as a binary signal (e.g., on/off, present, not present, etc.). The controller 102 may interpret the sensor signal 604 to determine an operation to be performed, if any, in response to the sensor signal 604 or in response to a particular value of the sensor signal 604. For example, the controller 102 may receive the sensor signal 604 and determine that a user has intervened (touched) a part that is coupled to the motor shaft. The controller 102 may then interpret the touch as the commencement of a user interaction, and may then reduce the torque applied by the stepper motor 106 to allow the user to more easily adjust a position of the part. Likewise, the sensor signal 604 may indicate when the user intervention is complete, which may provide information to the controller 102, which in turn may then increase the torque applied by the stepper motor 106. The operation of the controller 102 with the proximity sensor 602 is described in further detail in the following figures.

FIG. 7 shows a flow diagram of an illustrative process 700 to control the torque of the stepper motor 106 based in part on signals from the proximity sensor. The process 700 is described with reference to FIG. 6; however, the process 700 may be implemented with any of the embodiments described herein.

At 702, the controller 102 may receive a first proximity signal indicating user interaction with the motor shaft, or an impending interaction with the motor shaft (e.g., when the proximity signal 604 is not based on a touch sensor, etc.). For example, the first proximity signal may be a signal transmitted from the proximity sensor 602 when the user touches the proximity sensor that is on or adjacent to a part coupled to the motor shaft or a part coupled to a stationary part of the stepper motor. In some embodiments, the proximity signal received at the operation 702 may be a signal having a different value than a previous signal, such as an updated signal value that has a particular value of significance (e.g., a resistive value that indicates a touch by a user, etc.).

At 704, the controller 102 may reduce a torque applied by the stepper motor 106 in response to the operation 702 to allow the user to continue to intervene with the motor shaft (e.g., manually moving a first part relative to a second part, etc.). For example, the controller 102 may cause output of less current or no current in the vector control current 116 to the stepper motor 106.

At 706, the controller 102 may receive a second proximity signal indicating an end of the user interaction detected at the operation 702. For example, the second proximity signal may be a signal transmitted from the proximity sensor 602 when the user stops touching the proximity sensor 602 that is on or adjacent to a part coupled to the motor shaft or a part coupled to a stationary part of the stepper motor. In some embodiments, the proximity signal 604 received at the operation 706 may be a signal having a different value than a previous signal, such as an updated signal value that has a particular value of significance (e.g., a resistive value that indicates an absence of a touch by a user, etc.). The proximity signal received at the operation 706 may include a value similar to a value of the proximity signal prior to the event at the operation 702.

At 708, the controller 102 may cause an increase in torque applied by the stepper motor 106 in response to the operation 706. The increase in the torque may increase the torque to a holding torque to maintain a current position of the motor shaft or the increase may be torque to cause acceleration and movement of the motor shaft under control of the controller 102 (as opposed to under control of a user). In some embodiments, the operation 708 may be performed using the process 500 described above with reference to FIG. 5.

Figure 8:
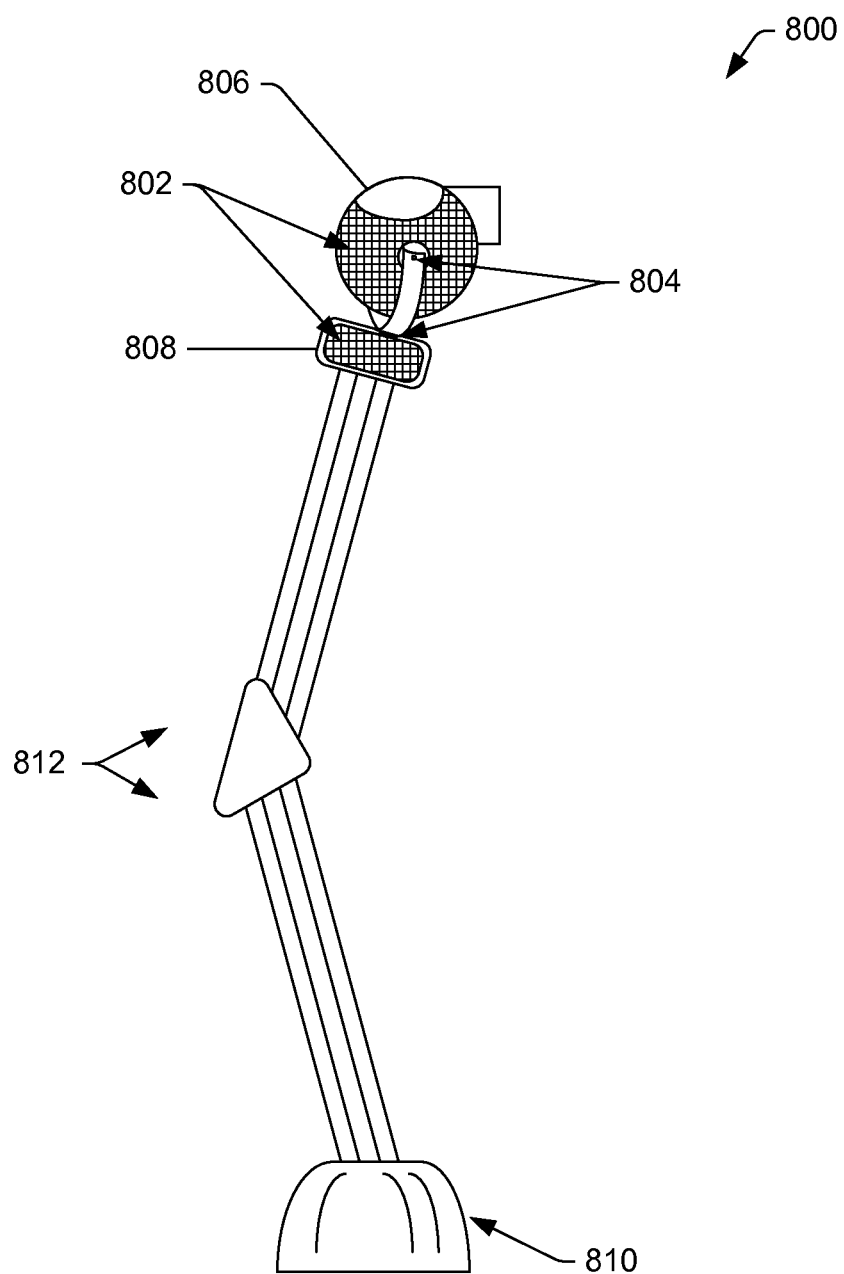
FIG. 8 shows an illustrative projection system that includes a proximity sensor and one or more stepper motors implementing variable torque.

FIG. 8 shows an illustrative projection system 800 that includes one or more of proximity sensors 802 and parts that are movable by one or more stepper motors 804 implementing variable torque. The projection system 800 may be configured as a table or desk projector with an adjustable arm or arms. However, the projection system 800 may be configured to be mounted in fixed locations (e.g., a wall, a ceiling, a floor, etc.) or include other features based on a particular implementation of the projection system.

As shown in FIG. 8, the projection system 800 may include a projection head 806 and a projection base 810. The projection head 806 may be coupled to the projection base 808 via the one or more stepper motors 804, and in some instances, with intervening structural supports (e.g., brackets, joints, etc.). Thus, the one or more stepper motors 802 may cause movement of the projection head 806 with respect to the projection base 808. In addition, a user may desire to move the projection head 806 relative to the projection base 808 and/or relative to a main base 810, possibly by also moving intervening joint(s) 812.

The projection system 800 may include the one or more proximity sensors 802 which provide the sensor signals 604 to the controller 102 to indicate a touch by a user, an impending touch (proximity of a user's appendage, etc.), or a termination thereof. Thus, in response to a user touching or being about to touch the projection head 806 or the projection base 808, the controller 102 may receive the sensor signals 604 and cause an eventual decrease in the torque of one or more of the stepper motors 804 to allow the user to reposition the projection head 806. When the user completes the adjustment of the projection head 806, such as by releasing a grasp on the projector system 800, the controller 102 may receive sensor signals indicating the end of the user interaction, and thus the controller 102 may increase the torque applied by the stepper motor to at least a holding torque.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A stepper motor assembly comprising:
   a stepper motor having at least a stator and a motor shaft, the motor shaft to rotate relative to the stator to a control position or to maintain the control position;
   an encoder to detect rotation of the motor shaft relative to the stator and output position feedback in response to the detected rotation;
   a driver to cause the motor shaft to rotate relative to the stator to the control position or to maintain the control position; and
   a controller configured to:
      receive the position feedback;
      provide a signal to the driver to cause movement of the motor shaft;
      determine occurrence of intervention with movement of the motor shaft relative to the stator based at least in part on the position feedback; and;
      decrease at least temporarily, a torque applied between the motor shaft and the stator during at least a portion of the occurrence of the intervention.

2. The stepper motor assembly as recited in claim 1, wherein the controller increases the torque to at least a holding torque to maintain a new position of the motor shaft relative to the stator.

3. The stepper motor assembly as recited in claim 1, further comprising a proximity sensor to transmit a signal to the controller to indicate an end of the intervention.

4. The stepper motor assembly as recited in claim 1, wherein the driver receives a vector control signal and generates a vector control current, based at least in part on the vector control signal, to be output to the stepper motor to cause the motor to rotate relative to the stator to the control position or to maintain the control position.

5. A method comprising:
   determining intervention of rotation of a motor shaft of a stepper motor relative to a stator of the stepper motor based on one or more of:
      a control position of the motor shaft relative to the stator being different than an actual position of the motor shaft, or
      a current feedback received by a controller indicating that the actual position is different than the control position;
   decreasing a torque applied between the motor shaft and the stator during at least a portion of the intervention; and
   increasing the torque to at least a holding torque to maintain a new position of the motor shaft relative to the stator.

6. The method as recited in claim 5, further comprising, prior to the decreasing the torque, increasing the torque toward a maximum torque in response to the current feedback indicating that the actual position is different than the control position.

7. The method as recited in claim 5, wherein the control position is based on a vector control current that specifies an amount of current for each coil of the stepper motor.

8. The method as recited in claim 5, wherein the control position is based on a vector control current that causes the motor shaft to rotate relative to the stator to the control position or to maintain the control position.

9. The method as recited in claim 5, wherein the control position is based on a vector control current and wherein the new position is based on a new vector control current different than the vector control current.

10. The method as recited in claim 5, wherein the determining the intervention comprises receiving a signal from a proximity sensor.

11. The method as recited in claim 5, further comprising determining an end of the intervention based at least in part on at least one of the control position indicating no rotation of the motor shaft relative to the stator during a first threshold amount of time or no current feedback being received by the controller during a second threshold amount of time.

12. The method as recited in claim 5, wherein the increasing the torque to at least the holding torque includes:
increasing the torque toward a maximum torque after determining an end of the intervention; and
decreasing the torque toward a minimum torque that maintains a position of the motor shaft relative to the stator to determine the holding torque.

13. The method as recited in claim 5, further comprising, prior to the determining the intervention, controlling the stepper motor to cause a constant angular velocity of the motor shaft relative to the stator.

14. The method as recited in claim 5, further comprising, after the increasing the torque to the at least the holding torque, controlling the stepper motor to cause a constant angular velocity of the motor shaft relative to the stator.

15. A system comprising:
a stepper motor to rotate a motor shaft, relative to a stator, to a control position or to maintain the control position; and
a controller to receive position feedback and to generate a control to cause the stepper motor to rotate relative to the stator to the control position or to maintain the control position, the controller to determine a torque between the motor shaft and the stator, the torque determined by at least:
determining intervention with the stepper motor based at least in part on the position feedback;
decreasing the torque during at least a portion of the intervention; and
increasing the torque to maintain a new position of the motor shaft relative to the stator.

16. The system as recited in claim 15, further comprising an encoder to detect rotation of the motor shaft relative to the stator and output the position feedback to the controller in response to the detected rotation.

17. The system as recited in claim 15, further comprising a proximity sensor to provide a signal indicating the position feedback.

18. The system as recited in claim 15, further comprising a driver to receive the control from the controller and to generate a vector control current to be output to the stepper motor to cause the stepper motor to rotate the motor shaft relative to the stator to the control position or to maintain the control position.

19. The system as recited in claim 15, further comprising a driver to detect current feedback from the stepper motor in response to an actual position of the motor shaft relative to the stator being different than the control position, wherein the controller receives the current feedback from the driver, and wherein, prior to decreasing the torque, the controller increases the torque toward a maximum torque in response to the current feedback indicating that the actual position is different than the control position.

20. The system as recited in claim 15, further comprising a driver to generate a new vector control current that corresponds to the new position of the motor shaft relative to the stator, the new vector control current to maintain the new position.

* * * * *